(12) United States Patent
Duckman

(10) Patent No.: US 7,093,037 B2
(45) Date of Patent: Aug. 15, 2006

(54) GENERALIZED QUEUE AND SPECIALIZED REGISTER CONFIGURATION FOR COORDINATING COMMUNICATIONS BETWEEN TIGHTLY COUPLED PROCESSORS

(75) Inventor: David James Duckman, Costa Mesa, CA (US)

(73) Assignee: Emulex Design & Manufacturing Corporation, Costa Mesa, CA (US)

(*) Notice: Subject to any disclaimer, the term of this patent is extended or adjusted under 35 U.S.C. 154(b) by 305 days.

(21) Appl. No.: 10/668,138

(22) Filed: Sep. 22, 2003

(65) Prior Publication Data

US 2005/0066080 A1   Mar. 24, 2005

(51) Int. Cl.
*G06F 3/00* (2006.01)
*G06F 13/00* (2006.01)

(52) U.S. Cl. .............. 710/52; 710/36; 710/39; 710/57; 711/147; 711/154

(58) Field of Classification Search .......... 710/52, 710/36, 39, 57; 711/147, 154
See application file for complete search history.

(56) References Cited

U.S. PATENT DOCUMENTS

| | | | | |
|---|---|---|---|---|
| 5,832,262 A | * | 11/1998 | Johnson et al. | 718/102 |
| 6,260,057 B1 | * | 7/2001 | Eykholt et al. | 718/102 |
| 6,725,457 B1 | * | 4/2004 | Priem et al. | 718/104 |
| 6,829,660 B1 | * | 12/2004 | Liu et al. | 710/22 |
| 2003/0110325 A1 | * | 6/2003 | Roach et al. | 710/22 |
| 2003/0126320 A1 | * | 7/2003 | Liu et al. | 710/22 |

* cited by examiner

*Primary Examiner*—Hong Kim
(74) *Attorney, Agent, or Firm*—Morrison & Foerster LLP

(57) ABSTRACT

Generalized queues and specialized registers associated with the generalized queues are disclosed for coordinating the passing of information between two tightly coupled processors. The capacity of the queues can be adjusted to match the current environment, with no limit on the size of the entry as agreed upon between the sending and receiving processors, and with no practical limit on the number of entries or restrictions on where the entries appear. In addition, the specialized registers allow for immediate notifications of queue and other conditions, selectivity in receiving and generating conditions, and the ability to combine data transfer and particular condition notifications in the same attention register.

24 Claims, 9 Drawing Sheets

GENERALIZED QUEUE AND SPECIALIZED REGISTER CONFIGURATION FOR COORDINATING COMMUNICATIONS BETWEEN TIGHTLY COUPLED PROCESSORS

BACKGROUND OF THE INVENTION

1. Field of the Invention

The present invention relates, generally, to communications between tightly coupled processors and, more particularly, to a queue register configuration structure for enabling cooperative communications between tightly coupled processors.

2. Description of Related Art

Host bus adapters (HBAs) are well-known peripheral devices that handle data input/output (I/O) operations for host devices and systems (e.g., servers). A HBA provides I/O processing and physical connectivity between a host device and external data storage devices. The storage may be connected using a variety of known "direct attached" or storage networking protocols, including fibre channel (FC) and Internet Small Computer System Interface (iSCSI). HBAs provide critical server central processing unit (CPU) off-load, freeing servers to perform application processing. HBAs also provide a critical link between storage area networks (SANs) and the operating system and application software residing within the server. In this role, the HBA enables a range of high-availability and storage management capabilities, including load balancing, SAN administration, and storage management.

FIG. 1 illustrates a block diagram of a conventional host system 100 including a HBA 102. The host system 100 includes a conventional host server 104 that executes application programs 106 in accordance with an operating system program 108. The server 104 also includes necessary driver software 110 for communicating with peripheral devices. The server 104 further includes conventional hardware components 112 such as a CPU and host memory such as read-only memory (ROM), hard disk storage, random access memory (RAM), cache and the like, which are well known in the art. The server 104 communicates via a host bus (such as a peripheral component interconnect (PCI or PCIX) bus) 114 with the HBA 102, which handles the I/O operations for transmitting and receiving data to and from remote storage devices 116 via a storage area network (SAN) 118.

In order to further meet the increasing demands of I/O processing applications, multi-processor HBA architectures have been developed to provide multi-channel and/or parallel processing capability, thereby increasing the processing power and speed of HBAs. These multiple processors may be located within the controller chip. FIG. 2 illustrates an exemplary block diagram of a HBA 200 including a multi-processor interface controller chip 202. The interface controller chip 202 controls the transfer of data between devices connected to a host bus 204 and one or more storage devices in one or more SANs. In the example embodiment illustrated in FIG. 2, the controller chip 202 supports up to two channels A and B, and is divided into three general areas, one area 232 for channel A specific logic, another area 206 for channel B specific logic, and a third area 208 for logic common to both channels.

Each channel on the controller chip 202 includes a serializer/deserializer (SerDes) 210 and a protocol core engine (PCENG) 212 coupled to the SerDes 210. Each SerDes 210 provides a port or link 214 to a storage area network. These links may be connected to the same or different storage area networks. The PCENG 212 may be specific to a particular protocol (e.g, FC), and is controlled by a processor 216, which is coupled to tightly coupled memory (TCM) 218 and cache 220. Interface circuitry 222 specific to each channel and interface circuitry common to both channels 224 couples the processor 216 to the host (e.g. PCI/PCIX) bus 204 and to devices external to the controller chip 202 such as flash memory 226 or quad data rate (QDR) SRAM 228.

When data is transferred from a device on the host bus 204 to a storage device on the link 214, the data is first placed in the QDR SRAM 228 under the control of the processor 216 that controls the link. Next, the data is transferred from the QDR SRAM 228 to the link 214 via the common interface circuitry 224 and channel-specific interface circuitry 222, PCENG 212 and SerDes 210 under the control of the processor 216. Similarly, when data is transferred from the link to the device on the host bus 204, the data is first transferred into the QDR SRAM 228 before being transferred to the device on the host bus.

In the example of FIG. 2, devices coupled to the host bus 204 can communicate with the interface controller chip 202 in three different modes. A first mode supports either channel A or channel B communications, a second mode supports both channel A and channel B communications working independently, and a third mode supports channel A and channel B communications working cooperatively. The interface controller chip 202 can be configured using straps or pins external or internal to the interface controller chip 202 to operate in any of these modes.

In the first mode (single channel operation), channel A may be operable with channel B completely reset. In this mode, only the channel A link is available. From the perspective of devices connected to the host bus 204, only a single channel A function is seen. Alternatively, the first mode can be configured such that channel B is operable with channel A completely reset. In this mode, only the channel B link is available. From the perspective of devices connected to the host bus 204, only a single channel B function is seen.

In the second mode (dual channel operation), both channel A and B are operable, both links are active, and devices connected to the host bus 204 sees the HBA 200 as a multifunction device. From the perspective of devices connected to the host bus 204, both channel A and channel B functions can be seen. In this mode, channel A and B operate completely independent of each other with regard to programs residing in memory. For instance, channel A could be controlled by one program in firmware and channel B could be controlled by another program in firmware. Alternatively, both channel A and B could be controlled by the same program. Nevertheless, there is no communication between channel A and channel B. Each channel can be reset independently and restarted independently, with no effect on the other channel or the common circuitry.

In the third mode (combined channel operation), both channel A and B are operable, both links are active, but the two channels cooperate as a single function. Although both channels are active and have completely different programs, the programs cooperate with each other to divide up and carry out activity. However, the actual control of each external link is private to its associated channel. For example, in FIG. 2 channel A (i.e. processor A) controls link A, and therefore before channel B (i.e. processor B) can send data out over link A, channel B would have to communicate with channel A to do so. Each channel can make requests of the other, and therefore the channels are not truly separate channels. From the perspective of devices connected to the host bus 204, only a single multilink channel is seen.

As noted above, in the combined channel operation, cooperative internal processing is required to carry out a single combined effort. As illustrated in FIG. 2, the circuitry dedicated to a particular channel includes a CPU 216, cache 220 and TCM 218 connected to the CPU 216. Each CPU 216 (e.g. a RISC processor) communicates with dedicated interface circuitry 222 through a processor private bus such as, for example, an ARM high speed bus (AHB) 230.

The third combined channel mode is sometimes referred to as the "supercharged" mode because twice the processing power can be obtained for a single set of commands. However, the supercharged mode creates other issues because communications are no longer "vertical" (limited to communications via the link 214 or through the common interface circuitry 224). In the combined channel mode the two channels now must communicate "horizontally" (communicate with each other and request services), and must cooperate with minimum interference with each other when utilizing common circuitry.

For example, one area of conflict is utilization of the QDR SRAM 228. When the QDR SRAM 228 is accessed, two memory words are processed every system clock, one on each clock edge. The quad data rate is achieved because there is a separate read port and write port. When transferring data from the link to a device connected to the host bus 204, the data is first transferred from the link to the QDR SRAM 228, and then from the QDR SRAM 228 to the device. Thus, every data transfer has a write phase followed by a read phase, and the number of QDR SRAM read and write operations is therefore equal. The interface controller chip 202 actually handles two streams of data for each link. For each of the two links 214, receive data is transferred from the link into the QDR SRAM 228, and then the receive data is transferred from the QDR SRAM 228 to the target device connected to the host bus 204. Also, for each of the two links 214, transmit data is transferred from the device to the QDR SRAM 228, and then the transmit data is transmitted from the QDR SRAM 228 to the link. In addition, each processor 216 may perform other operations such as reading instructions from the QDR SRAM 228 or monitoring certain data to track the status of the QDR SRAM 228. Although most data is processed out of the cache 220, when cache misses occur then the data must be accessed from the QDR SRAM 228. Because both processors 216 must share the same QDR SRAM 228 for the above-described operations, conflicts can arise.

Multi-channel conflicts with the QDR SRAM 228 may be reduced by utilizing an addressing scheme that includes address and channel, so that even if both processors use the same address, each processor will be accessing a different part of the QDR SRAM memory assigned to that channel. However, in the combined channel mode a different addressing scheme may be utilized in which each processor sees the entire QDR SRAM address space as a single address space. In this mode, the fact that the two processors can share the same QDR SRAM 228 and use the same address to get to the same memory location means that unless the two channels or processors have some means of communication, conflicts will arise.

The second area of conflict is in the flash memory 226. The flash memory 226 is a normally read-only memory that can be updated to store newer versions of programs or data. Each processor 216 has access to this flash memory 226 for functions such as reading boot code at wake-up time, or reading maintenance routines for updating the flash. Thus, there may be a number of requesting processors 216 for the flash 226, whether the interface controller chip 202 is operating in a single channel, dual channel, or combined channel mode.

As long as each requestor performs read operations only, no conflicts arise. However, if one requestor wants to update the flash 226 or read characteristics of the flash 226, rather than read the actual content of the flash 226, then the flash 226 goes into a mode that provides status information, not memory information. When this occurs, other requests for reading the flash must be blocked off, otherwise erroneous information may be provided.

Thus, a need exists for an apparatus and method that enables two or more tightly coupled processors to access and/or update the same QDR SRAM or flash or other resource, minimize conflicts with shared resources, request services that each processor cannot perform independently, or request sole use of a resource.

SUMMARY OF THE INVENTION

Embodiments of the present invention utilize specialized registers and generalized interprocessor queues for facilitating cooperative communications between tightly coupled processors. The generalized queues may be used to pass entries between processors, while the specialized registers contain information needed to assist the processors in utilizing the generalized queues for interprocessor communications.

Each processor is associated with one or more generalized queues, and each generalized queue is associated with one or more specialized registers. In embodiments of the present invention any number of processors, generalized queues and specialized processors may be employed.

The communication mechanism of embodiments of the present invention is symmetric in that each processor sees one or more generalized queues for supplying entries, and those same generalized queues appear to the other processor as one or more generalized queues for receiving entries. The generalized queues can hold messages, status or other information depending on the design of the programs running in the processors, and allow programmers to design the interprocessor communications. The processor supplying a generalized queue establishes the generalized queue by allocating memory space including start and end addresses.

The specialized registers may be accessible over the AHBs of the processors and may be located in both the common interface circuitry and the interface circuitry dedicated to each processor. The registers are composed of a fixed number of bits, and may be used for a number of purposes related to their associated generalized queues and communications between processors. The registers may be used to indicate the current status of the generalized queues (whether they contain entries or not), reset the queues, change the size of the queues, enable or disable attention conditions sent between processors, and coordinate transfers between the processors.

DETAILED DESCRIPTION OF PREFERRED EMBODIMENTS

In the following description of preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of the preferred embodiments of the present invention.

It should also be noted that although embodiments of the present invention are primarily described herein in terms cooperative communications between two tightly coupled processors in an interface controller chip within an HBA for purposes of illustration and discussion only, embodiments of the present invention are applicable to any number of tightly coupled processors in any environment where cooperation between the processors is required to minimize conflicts with shared resources, to request services that each processor cannot perform independently, or to request sole use of a resource.

There are several established mechanisms for communicating between tightly coupled processors. One mechanism is a simple "attention" signal, a bit in a register which may indicate that a processor is requesting a particular type of action or report. One processor can set an attention signal for another processor. For example, processor A might issue a request for processor B to perform a particular service by setting a particular attention line or flag. This may be accomplished by placing a register instantiated attention signal, perhaps an interrupt, onto a bus and/or into a register that will alert processor B of this request. These attention signals are often referred to as "doorbells" that are "rung" by one processor to get another processor's attention.

Figure 1:
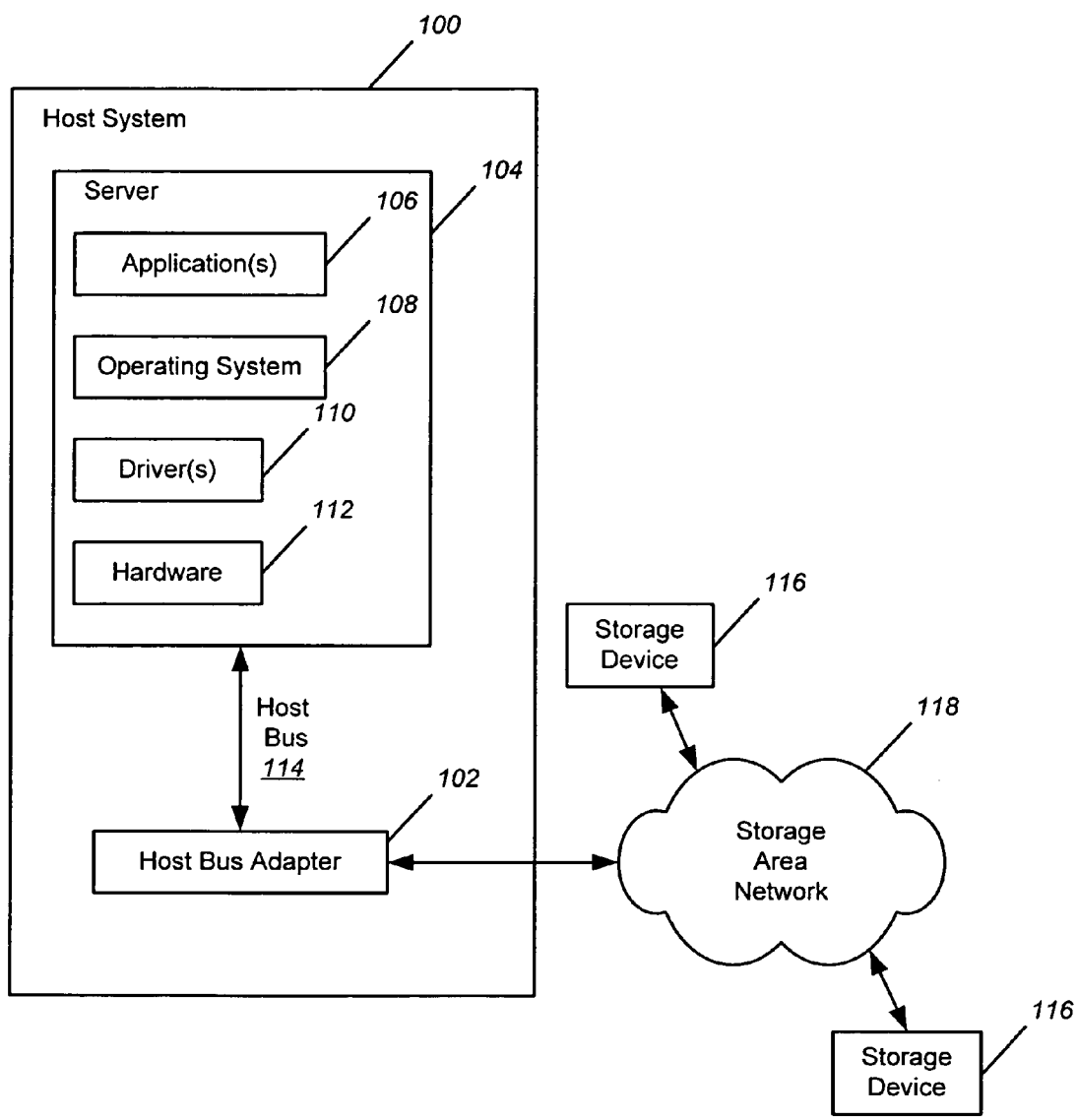
FIG. 1 illustrates an exemplary block diagram of a conventional host system including a HBA.
Figure 2:
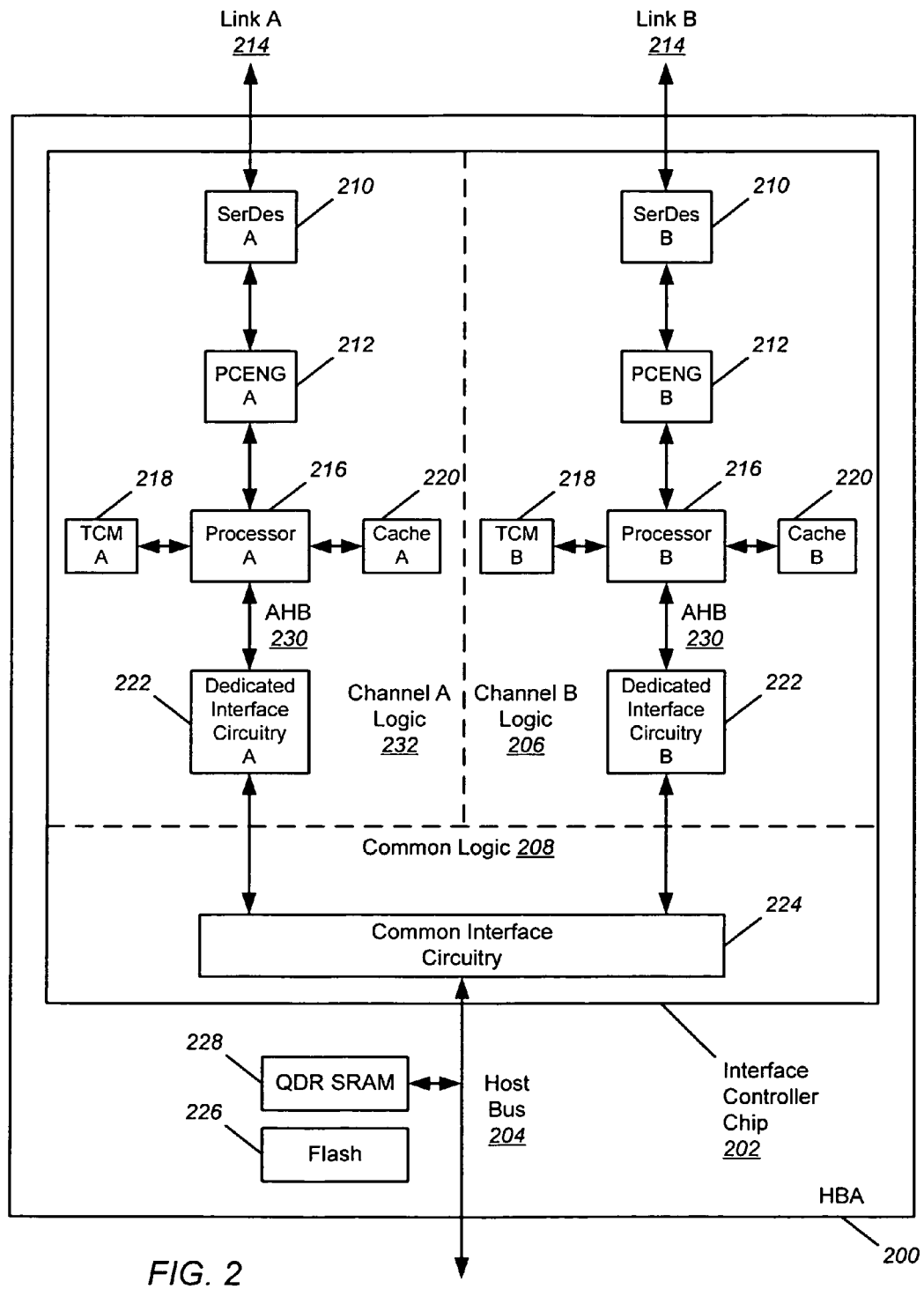
FIG. 2 illustrates an exemplary block diagram of a HBA including a multi-processor interface controller chip.
Figure 3:
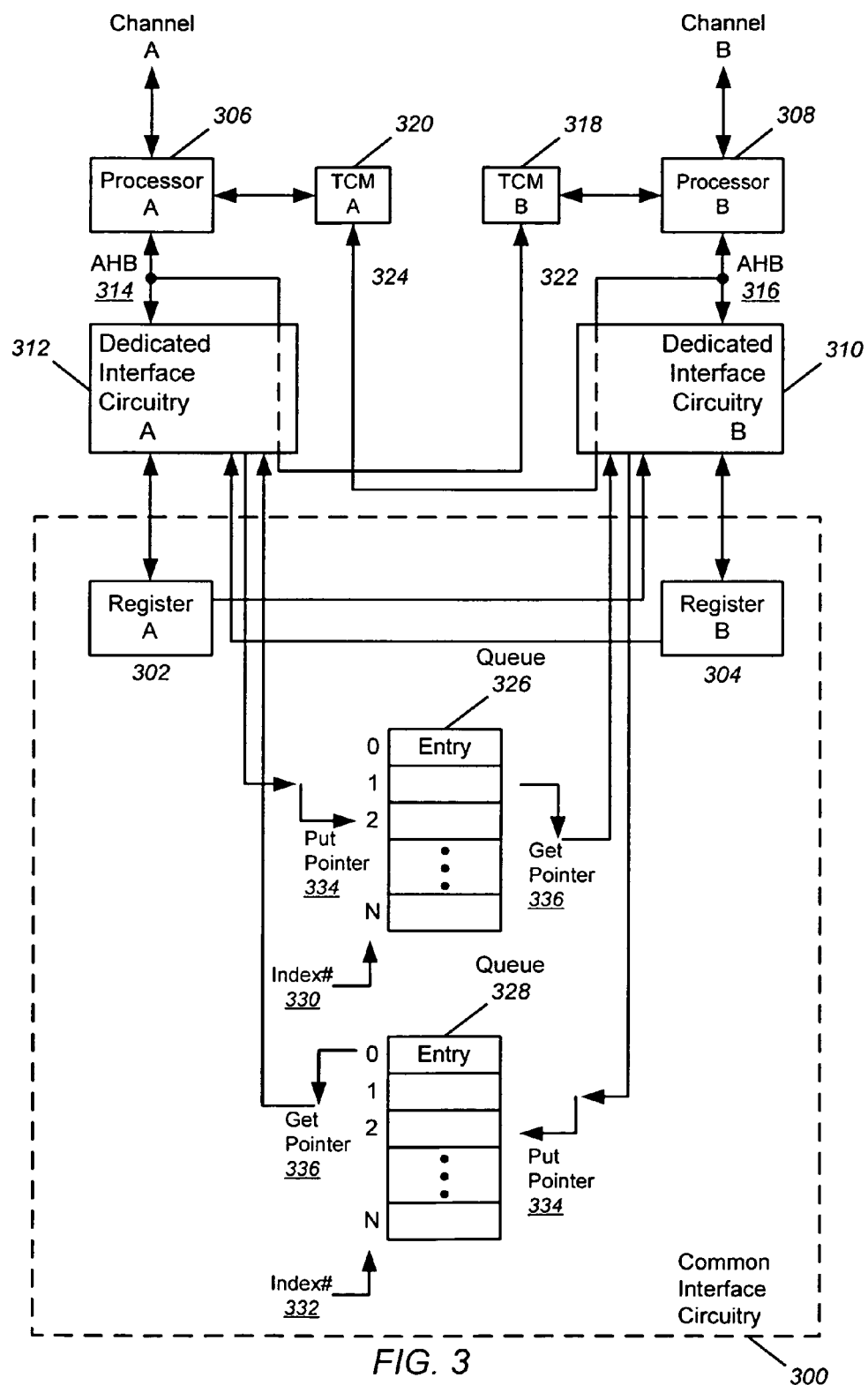
FIG. 3 is an exemplary block diagram of a multi-processor interface controller chip illustrating processor- or channel-specific interface circuitry including attention registers and queues for facilitating communications between tightly coupled processors.

FIG. 3 is an exemplary block diagram of a multi-processor interface controller chip illustrating common interface circuitry 300 including attention registers 302 and 304 and queues 326 and 328 for facilitating communications between tightly coupled processors 306 and 308. As shown in the example of FIG. 3, the attention register 302 of processor A is not directly coupled to the link or the host bus, but is readable by the interface circuitry 310 dedicated to processor B, and can under some circumstances interrupt processor B. Similarly, the attention register 304 of processor B is not directly coupled to the link or the host bus, but is readable by the interface circuitry 312 dedicated to processor A, and can under some circumstances interrupt processor A.

For a hardware perspective, attention signals may be generically implemented within attention registers. However, from a software perspective, programs can be written to assign meaning to each attention signal in each attention register. Thereafter, when processor A sets an attention signal, it may appear to processor B, who may then act upon the signal in accordance with its programming, including possibly doing nothing. Attention signals asserted by processor A may appear asynchronously as a set of enables to processor B that can be read at any time in order to determine if an interrupt to processor B should be performed.

Another mechanism for communicating between tightly coupled processors is interprocessor messaging. As illustrated in FIG. 3, a message facility allows processor A to write inter-processor message data directly over the AHB 314 to the TCM 318 of processor B via path 322, bypassing processor B. Part of the interface circuitry 312 dedicated to processor A may be configured to receive these 32-bit words from AHB 314 and place it in the TCM 318 of the processor B. The message data stored in the TCM 318 is thereafter available to processor B at a high access rate. Similarly, the message facility allows processor B to write inter-processor message data directly over the AHB 316 to the TCM 320 of processor A via path 324, bypassing processor A. Part of the interface circuitry 310 dedicated to processor B may be configured to receive these 32-bit words from AHB 316 and place it in the TCM 320 of the processor A. The message data stored in the TCM 320 is thereafter available to processor A at a high access rate.

The inter-processor messages may be in the form of 32-bit words transferred in series. Programs may be written to determine details such as how many words are needed, where the words are to be stored, and whether one or more arrays of blocks are to be reserved to receive the message information.

The TCM in each channel may also be used for other purposes, including processor-specific hardware notification reporting from the common interface circuitry through the dedicated interface circuitry to the TCM. Processor-specific notifications notify a processor of the status of operations controlled by that processor only (i.e. no cooperative processing). Processor-specific notifications such as completion words or completion event descriptions may be stored as messages in particular locations in the TCM of each processor and associated with attention conditions.

These processor-specific messages only consume a portion of the TCM, leaving other areas of the TCM available for other uses, including interprocessor messages. Thus, the TCM may be divided into several different areas, such as one area for receiving hardware notifications, one area for interprocessor messaging when the processors are cooperating, and another area which can be used as quick-access memory for each channel.

Yet another mechanism for communicating between tightly coupled processors is the use of queues. A queue is an array of entries of unspecified but equivalent sizes that is accessible by both processors. FIG. 3 illustrates queues 326 and 328. The entries of the queues can be identified by their index numbers 330 and 332. The beginning of the queue (index 0) is relative, and therefore may be assigned to any location within the queue.

A particular entry in the queue can be identified or "pointed to" by the index number. In the example of FIG. 3, one processor will be the supplier of information into a queue, and the other processor will be the receiver of the information. The supplier puts an entry into the queue at a particular location identified by a put pointer 334, which contains the index number of the location at which the next entry is to be placed. The receiver gets an entry from the queue at a particular location identified by a get pointer 336, which contains the index number of the location at which the next entry is to be taken.

The put pointer is the index of the entry that should next be written, and is incremented to the next location after the placement of an entry into the queue until the last location in the queue is reached. At that last location, the next location will be the zero index. The get pointer is the index of the entry that should next be retrieved, and is incremented to the next location after the retrieval of an entry from the queue until the last location in the queue is reached. At that last location, the next location will be the zero index.

If the put pointer and get pointer are equal (i.e. they point to the same index), there is nothing in the queue. This is true because the get pointer contains the index number of the next entry to be read, and the put pointer contains the index number of the next entry to be written, so if the get and put pointers are equal, the queue must be empty.

As described above, when the supplier puts a valid entry into the queue at the index indicated by the put pointer, the put pointer is incremented to the next index number. In doing so, the get and put pointers become unequal, providing an indication to the receiver that there is an entry to get. Using the get pointer, the receiver can receive entries until the get pointer is once again equal to the put pointer. The get pointer is therefore always "chasing" the put pointer. However, the put pointer should not be allowed to catch up to the get pointer, otherwise the queue will look empty, when in fact it is completely full and in danger of being overwritten. Therefore, the queue should never advance the put pointer until it is equal to the get pointer. By definition, a "full" condition can be defined as occurring when the put pointer is one behind the get pointer.

Once an entry has been placed in the queue by the supplier, several mechanisms are available to indicate to the receiver that the entry is now stored in the queue. In one example, each entry may contain an indicator that indicates an entry is valid once it has been written into the queue. The receiving processor may look for this indicator and change the indicator to an invalid state once it is read. By immediately changing the indicator's state to invalid, the receiving processor will be able to determine that a new entry has been posted into the queue only when the indicator has changed from an invalid to a valid state. Another way that the supplier could indicate that a new entry has been posted would be to ring a doorbell after posting an entry, indicating that a new entry is waiting.

Figure 4:
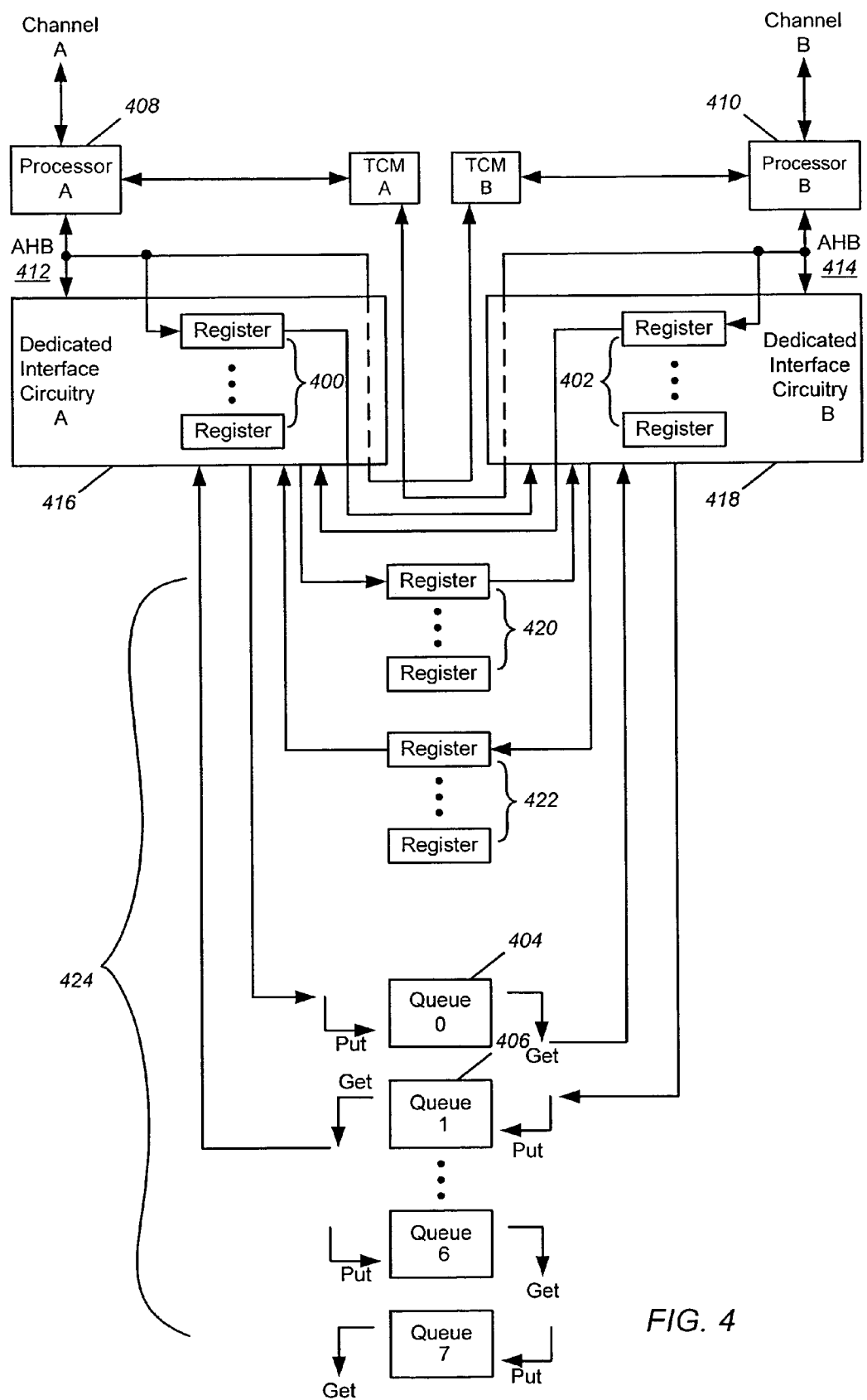
FIG. 4 is an exemplary block diagram of a multi-processor interface controller chip illustrating the use of specialized registers in combination with generalized interprocessor queues for facilitating cooperative communications between tightly coupled processors according to embodiments of the present invention.

Embodiments of the present invention utilize yet another mechanism for facilitating cooperative communications between tightly coupled processors. FIG. 4 is an exemplary block diagram of a multi-processor interface controller chip illustrating the use of specialized registers 400, 402, 420 and 422 in combination with generalized interprocessor queues 7:0 for facilitating cooperative communications between tightly coupled processors 408 and 410 according to embodiments of the present invention. The generalized queues are used to pass entries between processors 408 and 410, while the specialized registers contain information needed to assist the processors in utilizing the generalized queues for interprocessor communications.

In the example of FIG. 4, processor A at 408 is uniquely associated with specialized registers 400 in dedicated interface circuitry 416, while processor B at 410 is uniquely associated with specialized registers 402 in dedicated interface circuitry 418. Furthermore, both processors A and B are associated with registers 420 and 422 and the generalized queues 7:0. Queues 0, 2, 4 and 6 and registers 420 are utilized when processor A supplies information to processor B, and queues 1, 3, 5 and 7 and registers 422 are utilized when processor B supplies information to processor A. The queue number identification reflects an external view of the queues, but each processor views its supplying queues as the even-numbered ones and the receiving queues as the odd-numbered ones. The view of processor A matches the external view. It should be understood that although FIG. 4 illustrates two processors, eight generalized queues and a number of specialized registers, in embodiments of the present invention any number of processors, generalized queues and specialized registers may be employed. However, in a preferred embodiment, each processor in a two-processor embodiment is associated with four generalized queues for supplying entries and four generalized queues for receiving entries. Four was chosen because each generalized queue could be associated with communications between one of four interfaces (data going to and from the host, and data going to and from the external link).

The communication mechanism of embodiments of the present invention is symmetric in that each processor sees one or more generalized queues for supplying entries, and those same generalized queues appear to the other processor as one or more generalized queues for receiving entries. For example, as illustrated in FIG. 4, from the perspective of processor A the generalized queue 404 is for supplying entries, but from the perspective of processor 410 this same generalized queue 404 is for receiving entries. Similarly, from the perspective of processor 408 the generalized queue 406 is for receiving entries, but from the perspective of processor 410 this same generalized queue 406 is for supplying entries.

The generalized queues can hold messages, status or other information depending on the design of the programs running in the processors. The processor supplying a generalized queue establishes the generalized queue by allocating memory space including start and end addresses. The generalized queues allow programmers to design the interprocessor communications. Programs must be written to establish the format of a generalized queue entry and establish what information is to be contained in an entry.

Referring again to the example of FIG. 4, the specialized registers 400 and 402 are accessible over the AHBs 412 and 414 of the processors and are located in the interface circuitry 416 and 418 specific to each processor. The specialized registers 420 and 422 are located in the common interface circuitry 424. The specialized registers 400 and 402 are comprised of a fixed number of bits, and may be used for a number of purposes related to their associated generalized queues. The registers may be used to indicate the current status of the generalized queues 404 and 406 (whether they contain entries or not), coordinate transfers between the processors 408 and 410, or recognize the status of a generalized queue as an attention signal in and of itself, so that attention doorbells are not necessary. These and other functions will be described in greater detail in the paragraphs that follow, which describe the specialized registers available in the exemplary embodiment of FIG. 4.

Queue 0/1 Put/Get Pointer Register and Queue 1/0 Get/Put Pointer Register.

One function of the specialized registers is to store the get and put pointers for the processors. This information is important, because the locations of the get and put pointers are used to determine when a generalized queue is full, empty, not empty or not full. The not full state is useful because the supplier may need to know when the generalized queue has changed from full to not full, so a new entry can be put into the generalized queue. The not empty state is useful because the receiver may need to know when the generalized queue has changed from empty to not empty, so a new entry can be taken from the generalized queue. The state of the generalized queue may be reported to the processors in an asynchronous manner, along with doorbells and other interprocessor conditions.

Figure 5A:
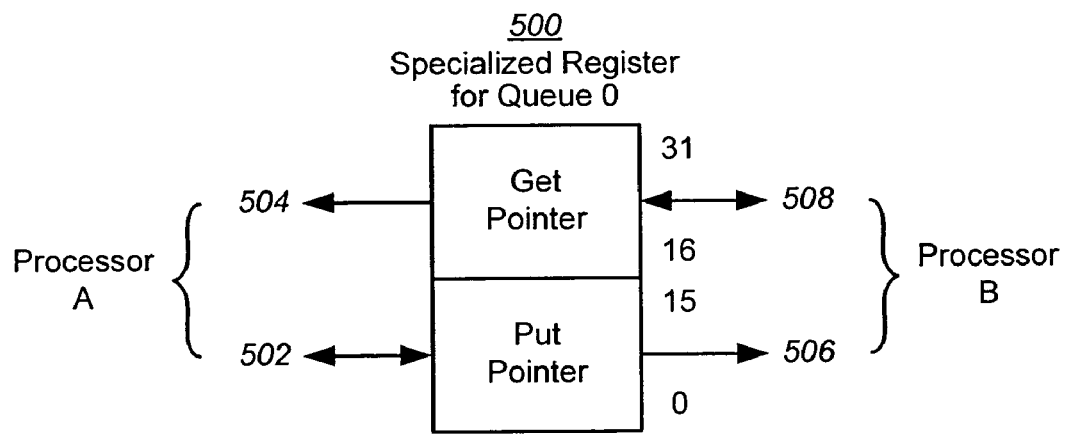
FIG. 5a illustrates a block diagram of an exemplary specialized register associated with Queue 0 and configured as a Queue 0/1 Put/Get Pointer Register and a Queue 1/0 Get/Put Pointer Register according to embodiments of the present invention.
Figure 5B:
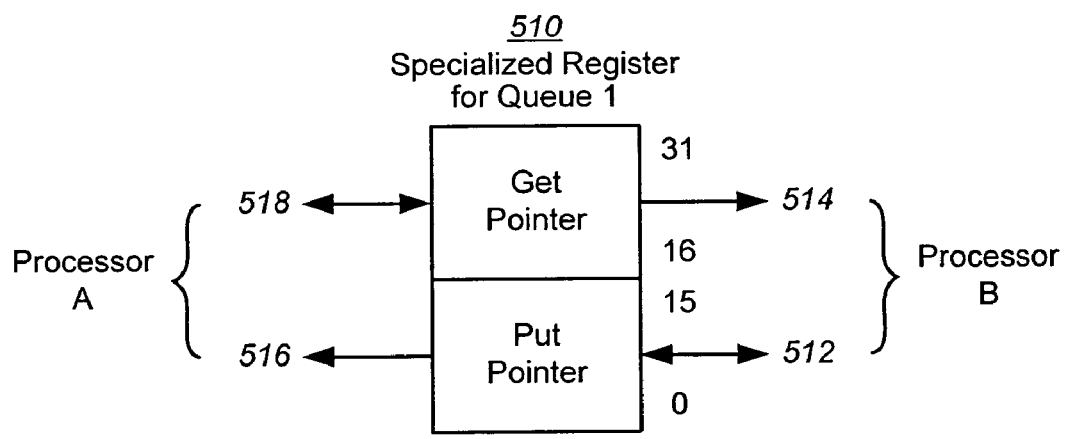
FIG. 5b illustrates a block diagram of an exemplary specialized register associated with Queue 1 and configured as a Queue 1/0 Get/Put Pointer Register and a Queue 0/1 Put/Get Pointer Register according to embodiments of the present invention.

FIGS. 5a and 5b and Tables 1 and 2 provide one exemplary mechanism for storing the get and put pointers according to embodiments of the present invention. FIG. 5a illustrates a block diagram of an exemplary specialized register 500 associated with Queue 0 (see reference 420 in FIG. 4) according to embodiments of the present invention. Queue 0 and specialized register 500 are used when Processor A is the supplier of information to Processor B. FIG. 5b illustrates a block diagram of an exemplary specialized register 510 associated with Queue 1 (see reference 422 in FIG. 4) according to embodiments of the present invention. Queue 1 and specialized register 510 are used when Processor B is the supplier of information to Processor A. Table 1 illustrates a content diagram of an exemplary Queue 0/1 Put/Get Pointer Register according to embodiments of the present invention. Table 2 illustrates a content diagram of an exemplary Queue 1/0 Get/Put Pointer Register according to embodiments of the present invention.

TABLE 1

Queue 0/1 Put/Get Pointer Register
Size: 32 Bits

| Field | Bits | Access | Description |
|---|---|---|---|
| Queue 0/1 Get Pointer | 31:16 | RO | Index of next queue entry for other processor to read in Queue 0 (Processor A) or Queue 1 (Processor B) |
| Queue 0/1 Put Pointer | 15:0 | R/W | Index of next queue entry to fill in Queue 0 (Processor A) or Queue 1 (Processor B) |

TABLE 2

Queue 1/0 Get/Put Pointer Register
Size: 32 Bits

| Field | Bits | Access | Description |
|---|---|---|---|
| Queue 1/0 Get Pointer | 31:16 | R/W | Index of next queue entry to read in Queue 1 (Processor A) or Queue 0 (Processor B) |
| Queue 1/0 Put Pointer | 15:0 | RO | Index of next queue entry for other processor to fill in Queue 1 (Processor A) or Queue 0 (Processor B) |

Referring again to FIG. 5a, once the specialized register 500 for Queue 0 is configured by the software, the bits of the register will be seen by Processor A as having the format defined in Table 1. When configured, Processor A will supply (or read) the current location of the put pointer for Queue 0 into bits 15:0 of the specialized register at 502, and will receive the current location of the get pointer for Queue 0 from bits 31:16 at 504. In addition, once the specialized register 500 for Queue 0 is configured by the software, the bits of the register will be seen by Processor B as having the format defined in Table 2. When configured, Processor B will receive the current location of the put pointer from bits 15:0 at 506, and will supply (or read) the current location of the get pointer into bits 31:16 at 508.

Referring again to FIG. 5b, once the specialized register 510 for Queue 1 is configured by the software, the bits of the register 510 will be seen by Processor B as having the format defined in Table 1. When configured, Processor B will supply (or read) the current location of the put pointer for Queue 1 into bits 15:0 of the specialized register at 512, and will receive the current location of the get pointer for Queue 1 from bits 31:16 at 514. In addition, once the specialized register 510 for Queue 1 is configured by the software, the bits of the register will be seen by Processor A as having the format defined in Table 2. When configured, Processor A will receive the current location of the put pointer from bits 15:0 at 516, and will supply (or read) the current location of the get pointer into bits 31:16 at 518.

In the exemplary embodiment, registers similar to those illustrated in FIGS. 5a and 5b may be employed for Queues 2–7.

Queue 0/1 Control Register and Queue 1/0 Control Register.

Another function of the specialized registers is to provide communications so that the processors can cooperate to reset the hardware and return the pointers back to the start entry (index zero). The need for such a reset is illustrated in the following example. Processor A can supply a value into the generalized queue at a location identified by the put pointer, but Processor A has no control of the get pointer. Processor B can receive a value from the generalized queue at a location identified by the get pointer, but Processor B has no control of the put pointer. A mechanism is needed to enable both the put and get pointers to be reset to the initial entry upon reset of the system or when an error has been detected.

Continuing the previous example for purposes of illustration only, one processor should not be able to unilaterally reset the get and put pointers. Because the content of the queue (full, empty, not full, not empty) is dependent on the position of the get and put pointers, if Processor A could unilaterally reset the put pointer, the new location of the put pointer may cause Processor B to misinterpret the status of the queue. Therefore, in one embodiment of the present invention, resetting the generalized queue requires the "consent" of both processors. For example, if Processor A wants to reset the generalized queue, Processor A must set a Processor A Reset Request bit in a specialized register to request a reset. At this point, all entries in the queue are treated as invalid, in case Processor B tries to receive an entry from the generalized queue before the generalized queue is reset. Processor B must observe that the reset request bit has been set, and then set a Processor B Reset Request bit to consent to the reset. When both reset request bits are set, the put and get pointers are reset to zero, and the reset request bits are both reset. With this protocol, one channel cannot unilaterally reset the generalized queue, and instead must wait until the other channel has seen the request and acknowledges that the other channel is also ready to reset.

Figure 6A:
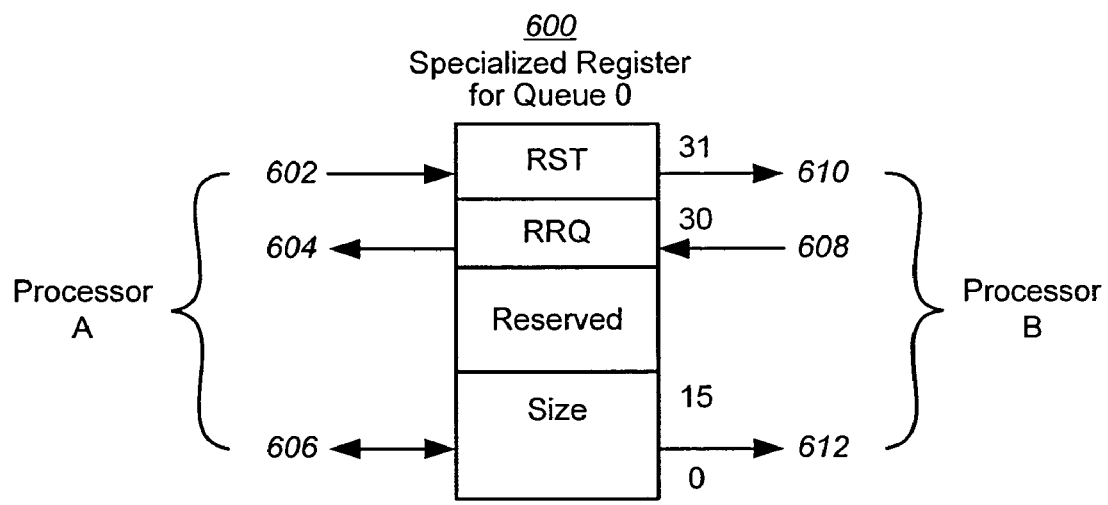
FIG. 6a illustrates a block diagram of an exemplary specialized register associated with Queue 0 and configured as a Queue 0/1 Control Register and a Queue 1/0 Control Register according to embodiments of the present invention.
Figure 6B:
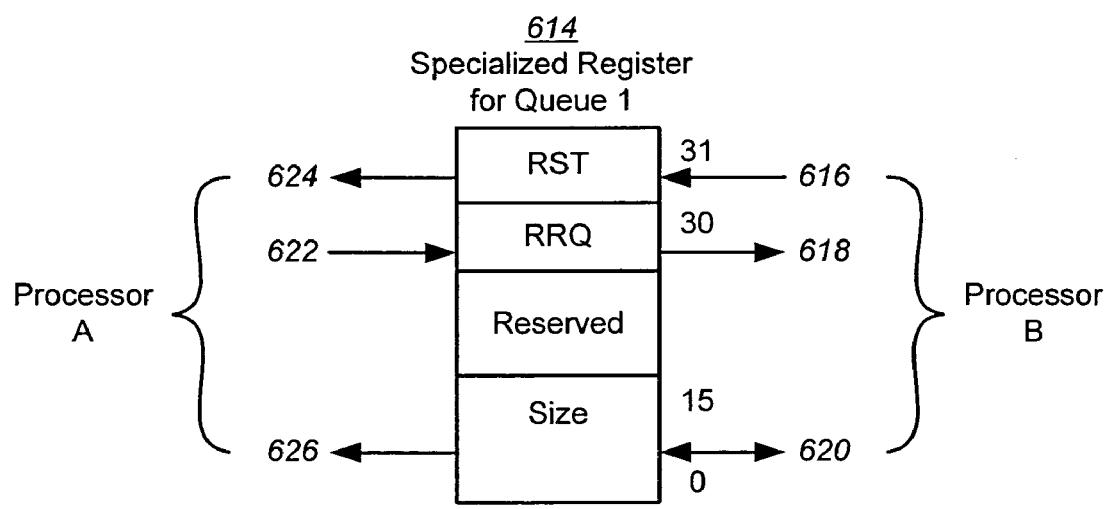
FIG. 6b illustrates a block diagram of an exemplary specialized register associated with Queue 1 and configured as a Queue 1/0 Control Register and a Queue 0/1 Control Register according to embodiments of the present invention.

FIGS. 6a and 6b and Tables 3 and 4 provide one exemplary mechanism for cooperatively resetting queues according to embodiments of the present invention. FIG. 6a illustrates a block diagram of an exemplary specialized register 600 associated with Queue 0 (see reference 420 in FIG. 4) according to embodiments of the present invention. Queue 0 and specialized register 600 are used when Processor A is the supplier of information to Processor B. FIG. 6b illustrates a block diagram of an exemplary specialized register 614 associated with Queue 1 (see reference 422 in FIG. 4) according to embodiments of the present invention. Queue 1 and specialized register 614 are used when Processor B is the supplier of information to Processor A. Table 3 illustrates a content diagram of an exemplary Queue 0/1 Control Register according to embodiments of the present invention. Table 4 illustrates a content diagram of an exemplary Queue 1/0 Control Register according to embodiments of the present invention.

TABLE 3

Queue 0/1 Control Register
Size: 32 Bits

| Field | Bits | Access | Description |
| --- | --- | --- | --- |
| RST 0/1 | 31 | R/S | Write '1' to set this bit and to request a reset of Queue 0 (Processor A) or Queue 1 (Processor B). Reset is not effective until asserted by both processors. Then both reset requests are cleared and the associated Put/Get Pointer and Get/Put Pointer Registers are both cleared. Writing '0' to this bit has no effect. When this bit is '1' in the data being written to the register, the other bits are ignored and the read/write bits are unchanged. |
| RRQ 0/1 | 30 | RO | Indication that the other processor is requesting reset of Queue 0 (Processor A) or Queue 1 (Processor B) |
| Reserved | 29:16 | | |
| Queue 0/1 Size | 15:0 | R/W | Index of last entry in Queue 0 (Processor A) or Queue 1 (Processor B) |

TABLE 4

Queue 1/0 Control Register
Size: 32 Bits

| Field | Bits | Access | Description |
| --- | --- | --- | --- |
| RST 1/0 | 31 | R/S | Write '1' to set this bit and to request a reset of Queue 1 (Processor A) or Queue 0 (Processor B). Reset is not effective until asserted by both processors. Then both reset requests are cleared and the associated Put/Get Pointer and Get/Put Pointer Registers are both cleared. Writing '0' to this bit has no effect. |
| RRQ 1/0 | 30 | RO | Indication that the other processor is requesting reset of Queue 1 (Processor A) or Queue 0 (Processor B) |
| Reserved | 29:16 | | |
| Queue 1/0 Size | 15:0 | RO | Index of last entry in Queue 1 (Processor A) or Queue 0 (Processor B) |

Referring again to FIG. 6a, once the specialized register 600 for Queue 0 is configured by the software, the bits of the register will be seen by Processor A as having the format defined in Table 3. When configured, Processor A may clear bit 31 or set bit 31 to request a reset of Queue 0 at 602, may receive a request to reset Queue 0 from Processor B as a set bit 30 at 604, and may supply (or read) the index number of the last entry in Queue 0 (the entry that precedes index 0) into bits 15:0 at 606. Note that when the request to reset bit 31 is set, it cannot be cleared until Queue 0 is reset, and that the reset of Queue 0 is not effective until both Processor A and B have requested a reset (i.e. bits 31 and 30 have been set). In addition, once the specialized register 600 for Queue 0 is configured by the software, the bits of the register will be seen by Processor B as having the format defined in Table 4. When configured, Processor B may set bit 30 to request a reset of Queue 0 at 608, may receive a request to reset Queue 0 from Processor A as a set bit 31 at 610, and may receive the index number of the last entry in Queue 0 from bits 15:0 at 612.

Referring again to FIG. 6b, once the specialized register 614 for Queue 1 is configured by the software, the bits of the register will be seen by Processor B as having the format defined in Table 3. When configured, Processor B may clear bit 31 or set bit 31 to request a reset of Queue 1 at 616, may receive a request to reset Queue 0 from Processor A as a set bit 31 at 618, and may supply (or read) the index number of the last entry in Queue 1 (the entry that precedes index 0) from bits 15:0 at 620. Note that when the request to reset bit 31 is set, it cannot be cleared until Queue 1 is reset, and that the reset of Queue 1 is not effective until both Processor A and B have requested a reset (i.e. bits 31 and 30 have been set). In addition, once the specialized register 614 for Queue 1 is configured by the software, the bits of the register will be seen by Processor A as having the format defined in Table 4. When configured, Processor B may set bit 30 to request a reset of Queue 1 at 622, may receive a request to reset Queue 1 from Processor B as a set bit 31 at 624, and may receive the index number of the last entry in Queue 1 into bits 15:0 at 626.

It should be understood that the index number of the last entry in the queue (the queue size value in bits 15:0) is needed because when the put pointer is equal to the size value, it will be set to index zero the next time the put pointer is incremented. Note also that is the supplier's responsibility to set the size register. Setting the size of the queue is important because although a large amount of memory is typically available either in common memory or in a queue area of the TCM, only a portion is reserved for a queue, and when a processor is initialized it may modify the number of entries in a particular queue (the size of the queue) based the amount of concurrent traffic to be maintained. The variable size of the generalized queues in embodiments of the present invention is an improvement over conventional fixed sized implementations. The generalized, variable size queues can be viewed as a "soft" first-in-first-out (FIFO) that can adjust to current traffic levels and different environments.

In the exemplary embodiment, registers similar to those illustrated in FIGS. 6a and 6b may be employed for Queues 2–7.

Queue 0/1 Base Register and Queue 1/0 Base Register.

Another function of the specialized registers is to store the start location (index 0) of the queues. This location is needed when the get or put pointers are incremented from their highest locations, when the queue is reset, and when reassigning the memory space allocated to a queue.

Figure 7A:
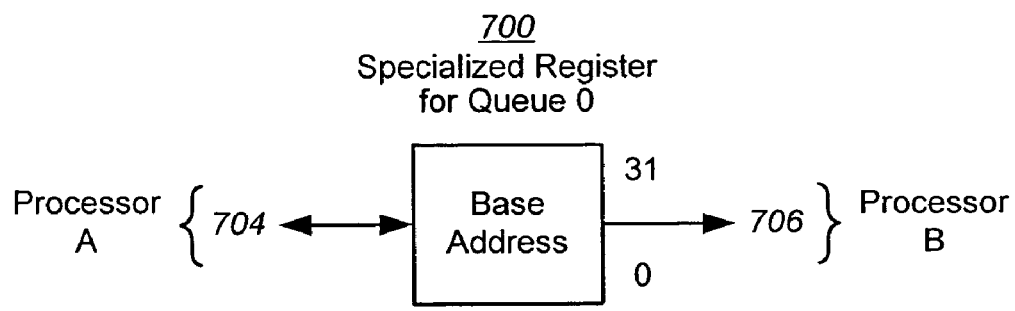
FIG. 7a illustrates a block diagram of an exemplary specialized register associated with Queue 0 and configured as a Queue 0/1 Base Register and a Queue 1/0 Base Register according to embodiments of the present invention.
Figure 7B:
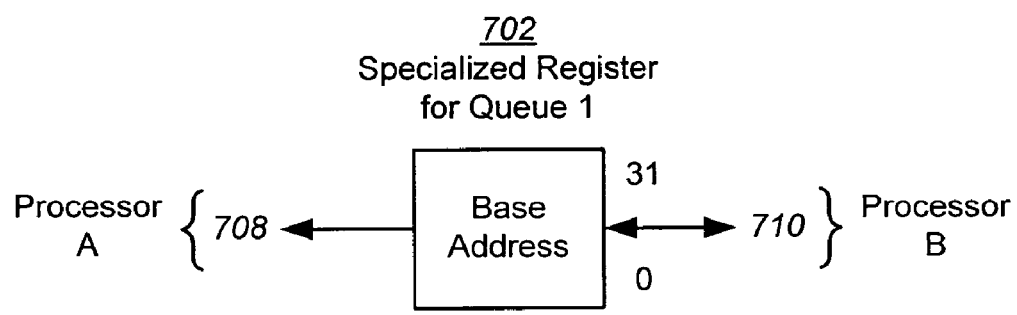
FIG. 7b illustrates a block diagram of an exemplary specialized register associated with Queue 1 and configured as a Queue 1/0 Base Register and a Queue 0/1 Base Register according to embodiments of the present invention.

FIGS. 7a and 7b and Tables 5 and 6 provide one exemplary mechanism for storing the address of index 0 of the queues according to embodiments of the present invention. FIG. 7a illustrates a block diagram of an exemplary specialized register 700 associated with Queue 0 (see reference 420 in FIG. 4) according to embodiments of the present invention. Queue 0 and specialized register 700 are used when Processor A is the supplier of information to Processor B. FIG. 7b illustrates a block diagram of an exemplary specialized register 702 associated with Queue 1 (see reference 422 in FIG. 4) according to embodiments of the present invention. Queue 1 and specialized register 702 are used when Processor B is the supplier of information to Processor A. Table 5 illustrates a content diagram of an exemplary Queue 0/1 Base Register according to embodiments of the present invention. Table 6 illustrates a content diagram of an exemplary Queue 1/0 Base Register according to embodiments of the present invention.

TABLE 5

Queue 0/1 Base Register
Size: 32 Bits

| Field | Bits | Access | Description |
|---|---|---|---|
| Queue 0/1 Base Address | 31:0 | R/W | Address of entry 0 of Queue 0 (Processor A) or Queue 1 (Processor B) |

TABLE 6

Queue 1/0 Base Register
Size: 32 Bits

| Field | Bits | Access | Description |
|---|---|---|---|
| Queue 1/0 Base Address | 31:0 | RO | Address of entry 0 of Queue 1 (Processor A) or Queue 1 (Processor B). |

Referring again to FIG. 7a, once the specialized register 700 for Queue 0 is configured by the software, the bits of the register will be seen by Processor A as having the format defined in Table 5. When configured, Processor A may supply (or read) the address of index 0 of Queue 0 into bits 31:0 at 704. In addition, once the specialized register 700 for Queue 0 is configured by the software, the bits of the register will be seen by Processor B as having the format defined in Table 6. When configured, Processor B may receive the address of index 0 of Queue 0 from bits 31:0 at 706.

Referring again to FIG. 7b, once the specialized register 702 for Queue 1 is configured by the software, the bits of the register will be seen by Processor B as having the format defined in Table 5. When configured, Processor B may supply (or read) the address of index 0of Queue 1 into bits 31:0 at 710. In addition, once the specialized register 702 for Queue 1 is configured by the software, the bits of the register will be seen by Processor A as having the format defined in Table 6. When configured, Processor A may receive the address of index 0 of Queue 1 from bits 31:0 at 708.

In the exemplary embodiment, registers similar to those illustrated in FIGS. 7a and 7b may be employed for Queues 2–7.

The specialized registers illustrated and described above support communications between supplier and receiver processors. Another function of the specialized registers is to provide reports on the status of the queues to the processors, such as displaying current conditions that may important to the processors. These specialized registers may be located within the dedicated interface circuitry of each processor/channel (see, e.g., references 400 and 402 in FIG. 4).

Processor Attention Condition Register and Processor Attention Set Register.

Figure 8:
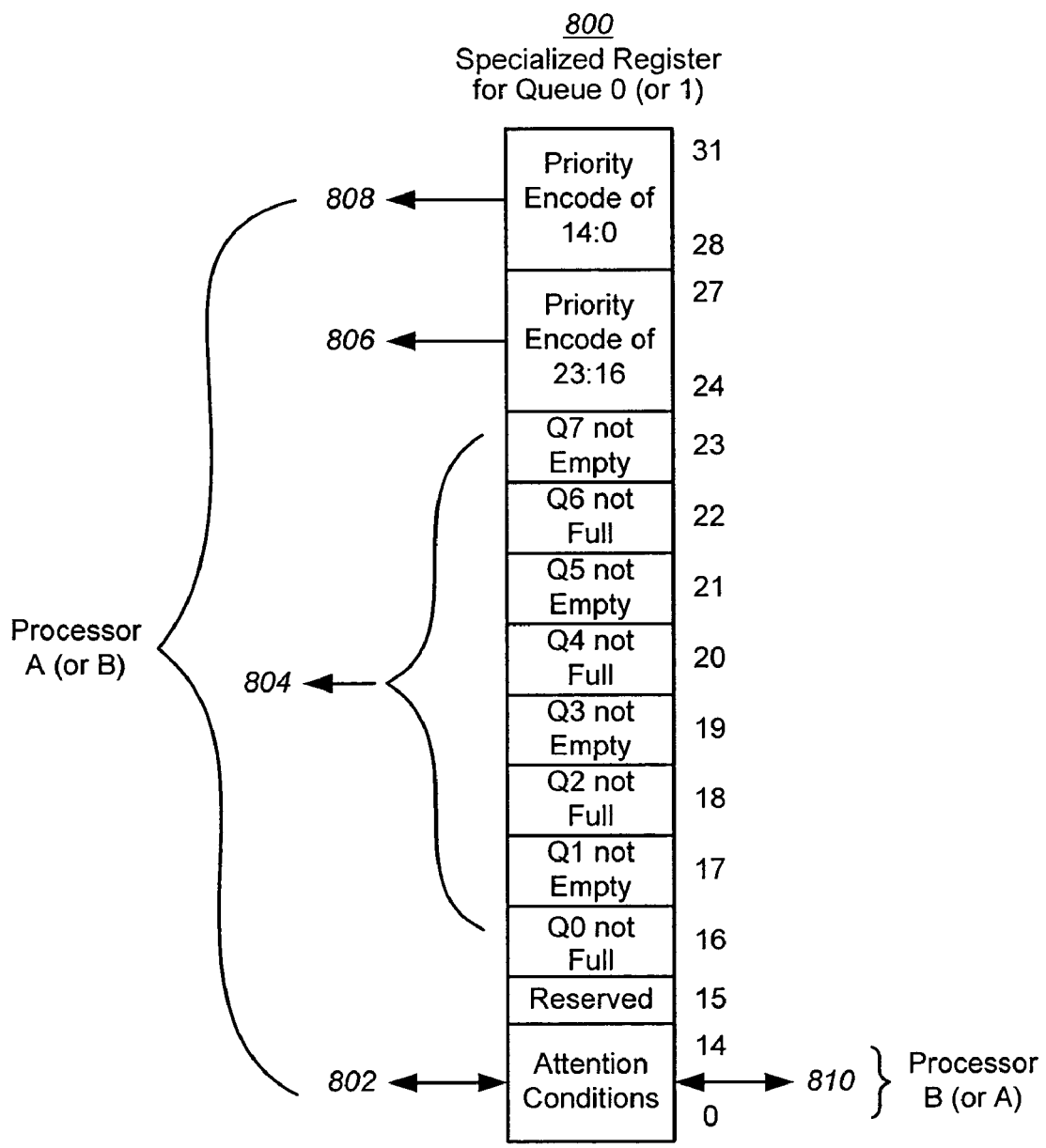
FIG. 8 illustrates a block diagram of an exemplary specialized register associated with either Processor A or B and configured as a Processor Attention Condition Register and a Processor Attention Set Register according to embodiments of the present invention.

FIG. 8 and Tables 7 and 8 provide one exemplary mechanism for displaying current conditions of the queues and attention conditions from another processor according to embodiments of the present invention. FIG. 8 illustrates a block diagram of an exemplary specialized register 800 associated with Processor A (or B) (see reference 400 (or 402) in FIG. 4) according to embodiments of the present invention. Table 7 illustrates a content diagram of an exemplary Processor Attention Condition Register according to embodiments of the present invention. Table 8 illustrates a content diagram of an exemplary Processor Attention Set Register according to embodiments of the present invention.

TABLE 7

Processor Attention Condition Register
Size: 32 Bits

| Field | Bits | Access | Description |
|---|---|---|---|
| | | | As seen by Processor A: |
| AHIP | 31:28 | RO | Priority encode of bits 14 to 0, indicates lowest bit number set:<br>0   A0     8   A8<br>1   A1     9   A9<br>2   A2    10   A10<br>3   A3    11   A11<br>4   A4    12   A12<br>5   A5    13   A13<br>6   A6    14   A14<br>7   A7    15   none (value after reset) |
| QHIPA | 27:24 | RO | Priority encode of bits 23 to 16, indicates lowest bit set:<br>0   Q0NF     5   Q5NE<br>1   Q1NE     6   Q6NF<br>2   Q2NF     7   Q7NE<br>3   Q3NE    8–14   reserved values<br>4   Q4NF    15   none (value after reset) |
| Q7NE | 23 | RO | Set if Queue 7 is not empty (Get Pointer not equal to Put Pointer) |
| Q6NF | 22 | RO | Set if Queue 6 is not full (Put Pointer - Get Pointer not equal to Size) and EQ6NF is set in Processor Attention Enable Register |
| Q5NE | 21 | RO | Set if Queue 5 is not empty (Get Pointer not equal to Put Pointer) |
| Q4NF | 20 | RO | Set if Queue 4 is not full (Put Pointer - Get Pointer not equal to Size) and EQ4NF is set in Processor Attention Enable Register |
| Q3NE | 19 | RO | Set if Queue 3 is not empty (Get Pointer not equal to Put Pointer) |
| Q2NF | 18 | RO | Set if Queue 2 is not full (Put Pointer - Get Pointer not equal to Size) and EQ2NF is set in Processor Attention Enable Register |
| Q1NE | 17 | RO | Set if Queue 1 is not empty (Get Pointer not equal to Put Pointer) |
| Q0NF | 16 | RO | Set if Queue 0 is not full (Put Pointer - Get Pointer not equal to Size) and EQ0NF is set in Processor Attention Enable Register |
| Reserved | 15 | | |
| A14 to A0 | 14:0 | R/C | Attention conditions for Processor A set by Processor B. Write a '1' to clear an attention condition. Writing '0' to any of these bits has no effect. |
| | | | As Seen by Processor B: |
| BHIP | 31:28 | RO | Priority encode of bits 14 to 0, indicates lowest bit number set:<br>8   B0     8   B8<br>9   B1     9   B9<br>10   B2    10   B10<br>11   B3    11   B11<br>12   B4    12   B12<br>13   B5    13   B13<br>14   B6    14   B14<br>15   B7    15   none (value after reset) |
| QHIPB | 27:24 | RO | Priority encode of bits 23 to 6, indicates lowest bit set:<br>0   Q1NF     5   Q4NE<br>1   Q0NE     6   Q7NF<br>2   Q3NF     7   Q6NE<br>3   Q2NE    8–14   reserved values<br>4   Q5NF    15   none (value after reset) |
| Q6NE | 23 | RO | Set if Queue 6 is not empty (Get Pointer not equal to Put Pointer) |
| Q7NF | 22 | RO | Set if Queue 7 is not full (Put Pointer - Get Pointer not equal to Size) and EQ7NF is set in Processor Attention Enable Register |
| Q4NE | 21 | RO | Set if Queue 4 is not empty (Get Pointer not equal to Put Pointer) |
| Q5NF | 20 | RO | Set if Queue 5 is not full (Put Pointer - Get Pointer not equal to Size) and EQ5NF is set in Processor Attention Enable Register |
| Q2NE | 19 | RO | Set if Queue 2 is not empty (Get Pointer not equal to Put Pointer) |
| Q3NF | 18 | RO | Set if Queue 3 is not full (Put Pointer - Get Pointer not equal to Size) and EQ3NF is set in Processor Attention Enable Register |
| Q0NE | 17 | RO | Set if Queue 0 is not empty (Get Pointer not equal to Put Pointer) |
| Q1NF | 16 | RO | Set if Queue 1 is not full (Put Pointer - Get Pointer not equal to Size) and EQ1NF is set in Processor Attention Enable Register |
| Reserved | 15 | | |
| B14 to B0 | 14:0 | R/C | Attention conditions for Processor B set by Processor A. Write a '1' to clear an attention condition. Writing '0' to any of these bits has no effect. |

TABLE 8

Processor Attention Set Register
Size: 32 Bits

| Field | Bits | Access | Description |
|---|---|---|---|
| *As Seen by Processor A:* | | | |
| Reserved | 31:15 | | |
| B14S to B0S | 14:0 | R/S | Write a '1' to set an Attention condition for Processor B. Writing '0' to any of these bits has no effect. The bits are cleared when Processor B writes '1' to the corresponding bit in its Attention Condition register. |
| *As Seen by Processor B:* | | | |
| Reserved | 31:15 | | |
| A14S to A0S | 14:0 | R/S | Write a '1' to set an Attention condition for Processor A. Writing '0' to any of these bits has no effect. The bits are cleared when Processor A writes '1' to the corresponding bit in its Attention Condition register. |

Referring again to FIG. 8, once the specialized register 800 is configured by the software, the bits of the register will be seen by Processor A (or B) as having the format defined in Table 7. When configured, Processor A (or B) may read or clear the attention conditions (doorbells) set by Processor B (or A) in bits 14:0 at 802. These doorbells may be configured by software for any number of purposes.

Processor A (or B) may also receive "not full" and "not empty" status bits for every queue in bits 23:16 at 804. There is one status bit for each queue. Note that in the present example, there are four pairs of queues, and therefore eight status bits.

Because Processor A (or B) is a supplier to Queues 0, 2, 4 and 6 in the present example, Processor A (or B) only needs to know when those queues are not full so it can know when a new entry can be placed in the queue. For example, if Processor A (or B) supplies an entry into the queue and tries to increment the put pointer, but finds that the incrementing operation is being disallowed because it would make the put pointer the same as the get pointer, this is an indication that the queue is full. Processor A (or B) must then wait for an interrupt at a later time indicating that the queue is no longer full before a new entry can be placed in the queue. A program running in Processor A (or B) can keep track of whether a queue is currently full, and wait for an interrupt condition indicating that the queue is no longer full. Note that the determination of the not full condition involves first determining if the queue is full (put pointer one less than the get pointer, or get pointer at zero and the put pointer is at the last entry), and determining the opposite of the full condition.

It should also be understood that in embodiments of the present invention, the "not full" status bits for Queues 0, 2, 4 and 6 do not actually become visible to Processor A (or B) unless those particular status bits are enabled in the Processor Attention Enable Register (discussed hereinafter). The enable bits associated with the status bits for Queues 0, 2, 4 and 6, if set, allows Processor A (or B) to access the "not full" status bits. If the enable bits are not set, then whether the status bits are set or not, Processor A (or B) will not have access to the status bits.

Because Processor A (or B) is a receiver from Queues 1, 3, 5 and 7 in the present example, Processor A (or B) only needs to know when those queues are not empty, so it knows when a new entry can be received from the queue. For example, if Processor A (or B) attempts to retrieve an entry from the queue at the location of the get pointer, but finds that the retrieve operation is being disallowed because the get pointer is the same as the put pointer, this is an indication that the queue is empty. A program running in Processor A (or B) can keep track of whether a queue is currently empty, and wait for an interrupt condition indicating that the queue is no longer empty. The determination of the not empty condition is made by determining that the get and put pointers are not the same.

Note that the "not empty" status bits for Queues 1, 3, 5 and 7 are always enabled and therefore are always visible to Processor A (or B).

Processor A (or B) may also receive a priority encoding of the queue status bits as a notification of the lowest queue status bit that is set at 806, and may receive a priority encoding of the attention condition bits (doorbells) as a notification of the lowest attention condition bit that is set at 808. A program can use the "lowest queue status bit that is set" number to select the routine specifically designed to handle the queue. The specific routine is able to handle the condition and clear the appropriate attention bit without having to scan the set of possible conditions. Once one queue's condition has been handled and cleared, the priority encoding changes and the program uses the new number to select the routine for another queue that has a condition pending.

Referring again to FIG. 8, once the specialized register 800 is configured by the software, the bits of the register will be seen by Processor B (or A) as having the format defined in Table 8. When configured, Processor B (or A) may set or clear attention conditions (doorbells) for Processor A (or B) in bits 14:0 at 810. These doorbells may be configured by software for any number of purposes.

A generalized example of the setting and clearing of the doorbells is now provided. In this example, if Processor B wanted to ring doorbell A0 (see Table 7) for Processor A, then Processor B would first write a "1" into A0S (see Table 8). A "1" in A0S would appear to Processor A as a "1" in A0, because A0S and A0 are the same bit, identified differently by Processor A and B. The "1" in A0S as set by Processor B will remain until it is cleared by Processor A. Once Processor A receives attention bit A0, it informs Processor B that it has received the attention bit by writing a "1" into A0, which clears A0 by returning it to a "0". Note that if either Processor writes a "0" into the attention bit, nothing will happen. This precaution minimizes the chance of inadvertently clearing an attention bit. Once Processor A has cleared A0, Processor B can confirm that the doorbell has been answered by reading a "0" in A0S. Alternatively, the programs could be designed to have Processor B set a predetermined attention bit for Processor B to announce that Processor A has completed the activity that Processor B requested by setting the original attention bit.

Processor Attention Enable Register and Processor Attention Accept Register.

Figure 9:
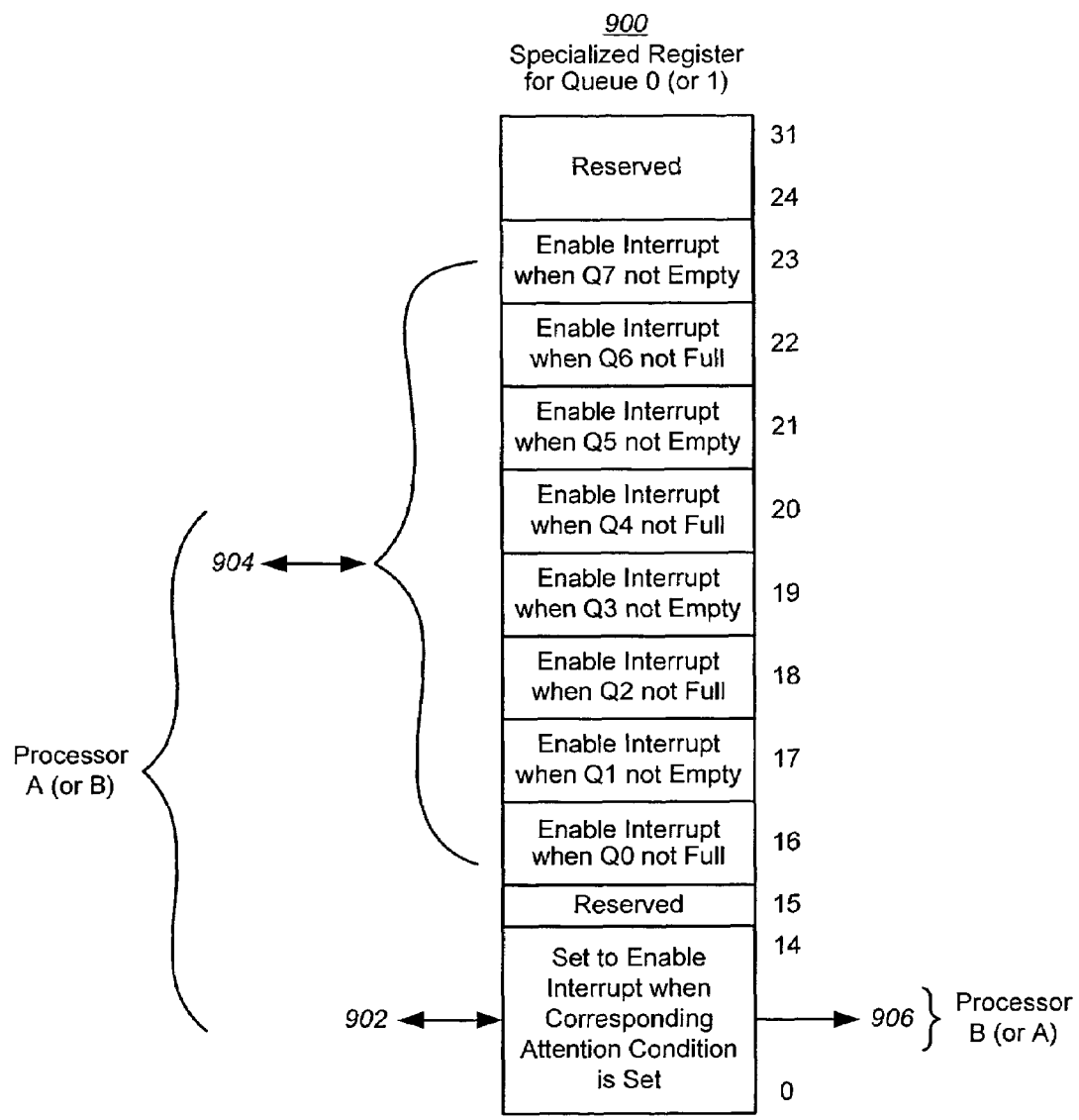
FIG. 9 illustrates a block diagram of an exemplary specialized register associated with either Processor A or B and configured as a Processor Attention Enable Register and a Processor Attention Accept Register according to embodiments of the present invention.

FIG. 9 and Tables 9 and 10 provide a mechanism for improving the efficiency of processors by conditioning their ability to generate and receive attention condition bits (doorbells) according to embodiments of the present invention. FIG. 9 illustrates a block diagram of an exemplary specialized register 900 associated with Processor A (or B) (see reference 400 (or 402) in FIG. 4) according to embodiments of the present invention. Table 9 illustrates a content diagram of an exemplary Processor Attention Enable Register according to embodiments of the present invention. Table 10 illustrates a content diagram of an exemplary Processor Attention Accept Register according to embodiments of the present invention.

TABLE 9

Processor Attention Enable Register
Size: 32 Bits

| Field | Bits | Access | Description |
|---|---|---|---|
| | | | *As Seen by Processor A:* |
| Reserved | 31:24 | | |
| EQ7NE | 23 | R/W | Set to enable interrupt (I3#) when Queue 7 is not empty (Get Pointer not equal to Put Pointer). Clear to disable Queue 7 Not Empty condition from causing interrupt. |
| EQ6NF | 22 | R/W | Set to enable interrupt (I3#) when Queue 6 is not full (Put Pointer - Get Pointer not equal to Size). Clear to ignore Queue 6 Not Full condition (disable setting in condition register). |
| EQ5NE | 21 | R/W | Set to enable interrupt (I3#) when Queue 5 is not empty (Get Pointer not equal to Put Pointer). Clear to disable Queue 5 Not Empty condition from causing interrupt. |
| EQ4NF | 20 | R/W | Set to enable interrupt (I3#) when Queue 4 is not full (Put Pointer - Get Pointer not equal to Size). Clear to ignore Queue 4 Not Full condition (disable setting in condition register). |
| EQ3NE | 19 | R/W | Set to enable interrupt (I3#) when Queue 3 is not empty (Get Pointer not equal to Put Pointer). Clear to disable Queue 3 Not Empty condition from causing interrupt. |
| EQ2NF | 18 | R/W | Set to enable interrupt (I3#) when Queue 2 is not full (Put Pointer - Get Pointer not equal to Size). Clear to ignore Queue 2 Not Full condition (disable setting in condition register). |
| EQ1NE | 17 | R/W | Set to enable interrupt (I3#) when Queue 1 is not empty (Get Pointer not equal to Put Pointer). Clear to disable Queue 1 Not Empty condition from causing interrupt. |
| EQ0NF | 16 | R/W | Set to enable interrupt (I3#) when Queue 0 is not full (Put Pointer - Get Pointer not equal to Size). Clear to ignore Queue 0 Not Full condition (disable setting in condition register). |
| Reserved | 15 | | |
| A14E to A0E | 14:0 | R/W | Set to enable interrupt (I3#) when corresponding Attention condition for Processor A is set by Processor B. Clear to disable corresponding condition from causing interrupt. |
| | | | *As Seen by Processor B:* |
| Reserved | 31:24 | | |
| EQ6NE | 23 | R/W | Set to enable interrupt (I3#) when Queue 6 is not empty (Get Pointer not equal to Put Pointer). Clear to disable Queue 6 Not Empty condition from causing interrupt. |
| EQ7NF | 22 | R/W | Set to enable interrupt (I3#) when Queue 7 is not full (Put Pointer - Get Pointer not equal to Size). Clear to ignore Queue 7 Not Full condition (disable setting in condition register). |
| EQ4NE | 21 | R/W | Set to enable interrupt (I3#) when Queue 4 is not empty (Get Pointer not equal to Put Pointer). Clear to disable Queue 4 Not Empty condition from causing interrupt. |
| EQ5NF | 20 | R/W | Set to enable interrupt (I3#) when Queue 5 is not full (Put Pointer - Get Pointer not equal to Size). Clear to ignore Queue 5 Not Full condition (disable setting in condition register). |
| EQ2NE | 19 | R/W | Set to enable interrupt (I3#) when Queue 2 is not empty (Get Pointer not equal to Put Pointer). Clear to disable Queue 2 Not Empty condition from causing interrupt. |
| EQ3NF | 18 | R/W | Set to enable interrupt (I3#) when Queue 3 is not full (Put Pointer - Get Pointer not equal to Size). Clear to ignore Queue 3 Not Full condition (disable setting in condition register). |
| EQ0NE | 17 | R/W | Set to enable interrupt (I3#) when Queue 0 is not empty (Get Pointer not equal to Put Pointer). Clear to disable Queue 0 Not Empty condition from causing interrupt. |
| EQ1NF | 16 | R/W | Set to enable interrupt (I3#) when Queue 1 is not full (Put Pointer - Get Pointer not equal to Size). Clear to ignore Queue 1 Not Full condition (disable setting in condition register). |
| Reserved | 15 | | |
| B14E to B0E | 14:0 | R/W | Set to enable interrupt (I3#) when corresponding Attention condition for Processor B is set by Processor A. Clear to disable corresponding condition from causing interrupt. |

TABLE 10

Processor Attention Accept Register
Size: 32 Bits

| Field | Bits | Access | Description |
|---|---|---|---|
| As Seen by Processor A: | | | |
| Reserved | 31:15 | | |
| B14E to B0E | 14:0 | RO | These bits display the current value of the corresponding bits in the Processor B Attention Enable Register |
| As Seen by Processor B: | | | |
| Reserved | 31:15 | | |
| A14E to A0E | 14:0 | RO | These bits display the current value of the corresponding bits in the Processor A Attention Enable Register. |

The Processor Attention Enable Register is associated with the Processor Attention Condition Register and conditions the associated processor's ability to receive interrupts resulting from attention condition bits (doorbells) so that the processor is not needlessly interrupted when certain conditions occur. For example, once a processor has been notified that a queue is not empty via an enabled bit in the Processor Attention Condition Register, the processor may reset the enable bit in the Processor Attention Enable Register that is associated with that condition, thereby preventing the Processor Attention Condition Register from receiving further interrupts signifying that the queue is not empty, which would otherwise slow down the processor. The processor may again set the enable bit in the Processor Attention Enable Register only after the queue has been emptied, because it may take the processor a long time to retrieve and process each entry.

Referring again to FIG. 9, once the specialized register 900 is configured by the software, the bits of the register will be seen by Processor A (or B) as having the format defined in Table 9. When configured, Processor A (or B) may set or clear the enables for the attention conditions (doorbells) set by Processor B (or A) in bits 14:0 at 902. These doorbells appear in bits 14:0 of the Processor Attention Condition Register in FIG. 8 and Table 7.

Processor A (or B) may also set or clear the enables for the "not full" and "not empty" attention conditions (doorbells) that appear in bits 23:16 of the Processor Attention Condition Register in FIG. 9 and Table 9 at 904. These associated enables appear in bits 23:16 of the Processor Attention Enable Register in FIG. 9 and Table 9.

As noted above, the Processor Attention Enable Register is associated with the Processor Attention Condition Register and conditions the associated processor's ability to receive interrupts resulting from attention condition bits (doorbells) so that the processor is not needlessly interrupted when certain conditions occur. An additional level of efficiency may be provided by not allowing a processor to generate interrupts if it is known that the target processor is not enabled to receive those interrupts.

Referring again to FIG. 9, once the specialized register 900 is configured by the software, the bits of the register will be seen by Processor B (or A) as having the format defined in Table 10. When configured, Processor B (or A) may receive the enables for attention conditions (doorbells) generated by Processor B (or A) and destined for Processor A (or B) in bits 14:0 at 906. If Processor B (or A) notes that a particular doorbell generated by Processor B (or A) has been disabled such that it will not be seen by Processor A (or B), Processor B (or A) will not even generate the doorbell.

As described above, embodiments of the present invention utilize queues for passing information between two tightly coupled processors in a generalized manner, so that the capacity of the queues can be adjusted to match the current environment. If the capacity of the queues needs to be adjusted, then queues must first be reset, and then resized. With generalized queues, an appropriately sized queue may be created, with no limit on the size of the entry as agreed upon between the sending and receiving processors, and with no practical limit on the number of entries or restrictions on where the entries appear. The queues could be created in the QDR SRAM, TCM, other internal memory, or host memory. The generalized queues enable queues to be created wherever needed in whatever size is needed, without the restrictions of conventional ad hoc implementations. In addition, the queues and registers of embodiments of the present invention allow for immediate notifications of conditions, selectivity in receiving and generating conditions, and the ability to combine data transfer and particular condition notifications in the same attention register.

It should be understood that the register diagrams provided above are exemplary and for purposes of illustration only. In other embodiments, the bits and groupings of conditions could have been assigned in other ways, although in a preferred embodiment, the entire set of conditions that reflect one processor are combined in a single specialized register.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for coordinating communications between a plurality of tightly coupled processors, comprising:
   one or more generalized queues communicatively couplable to the tightly coupled processors for storing entries to be passed between the tightly coupled processors, each queue having a start location, an end location, a put pointer for indicating a next location in the queue into which an entry is to be supplied, and a get pointer for indicating a next location in the queue from which a entry is be received; and
   one or more specialized registers communicatively couplable to the tightly coupled processors for assisting the tightly coupled processors in utilizing the generalized queues for interprocessor communications and adapting the generalized queues to match a current operating environment;
   wherein the generalized queues and specialized registers are content-configurable in accordance with programs executable in the tightly coupled processors.

2. The apparatus as recited in claim 1, further comprising at least one specialized register for storing the put pointer and the get pointer of a generalized queue associated with the specialized register to assist in supplying entries into the generalized queue, receiving entries from the generalized queue, and determining whether the generalized queue is empty, full, not full, or not empty.

3. The apparatus as recited in claim 1, further comprising at least one specialized register for storing an end location of a generalized queue associated with that specialized register to dynamically adapt a size of the generalized queue to the current operating environment.

4. The apparatus as recited in claim 1, further comprising at least one specialized register for storing requests from two or more processors to reset a generalized queue being utilized to pass entries between the processors, in order to facilitate a coordinated reset of that generalized queue.

5. The apparatus as recited in claim 1, further comprising at least one specialized register for storing attention conditions from one processor destined for another processor.

6. The apparatus as recited in claim 1, further comprising at least one specialized register for storing whether the generalized queues are not empty or not full.

7. The apparatus as recited in claim 4, further comprising at least one specialized register for storing an enable indicating whether an attention condition destined for one processor will be visible to that processor.

8. The apparatus as recited in claim 4, further comprising at least one specialized register for storing an enable indicating whether an indicator of whether the generalized queue is not empty or not full destined for one processor will be visible to that processor.

9. The apparatus of claim 1, wherein the apparatus is housed in an interface controller chip, and wherein the one or more tightly coupled processors are for providing I/O processing and physical connectivity between a host device coupled to a host bus and external data storage devices coupled to one or more storage area networks.

10. The apparatus of claim 9, wherein the interface controller chip is housed in a host bus adapter (HBA), and wherein the host bus is a PCI or PCI-X bus and the external data storage devices communicate over the one or more storage area networks using fibre channel (FC) protocols.

11. The apparatus of claim 10, wherein the HBA is housed in a server computer.

12. In a multi-processor system including a plurality of tightly coupled processors and one or more generalized queues communicatively couplable to the tightly coupled processors for storing entries to be passed between the tightly coupled processors, an apparatus for coordinating communications between the tightly coupled processors, comprising:
one or more specialized registers communicatively couplable to the tightly coupled processors and configurable in accordance with programs executable in the tightly coupled processors for
adjusting a size and location of the generalized queues to dynamically adapt the generalized queue to the current operating environment;
informing the tightly coupled processors when the generalized queues are empty, full, not empty, or not full; and
enabling attention conditions to be passed between the tightly coupled processors.

13. An apparatus for providing I/O processing and physical connectivity between a host device coupled to a host bus and external data storage devices coupled to one or more storage area networks, comprising:
a plurality of tightly coupled processors for coordinating a transfer of information between the host device and the external storage devices;
one or more generalized queues communicatively couplable to the tightly coupled processors for storing entries to be passed between the tightly coupled processors; and
one or more specialized registers communicatively couplable to the tightly coupled processors and config-
urable in accordance with programs executable in the tightly coupled processors for assisting the tightly coupled processors in utilizing the generalized queues for interprocessor communications and adapting the generalized queues to match a current operating environment;
wherein the generalized queues and specialized registers are content-configurable in accordance with programs executable in the tightly coupled processors.

14. The apparatus as recited in claim 13, wherein the tightly coupled processors are programmed for utilizing the one or more specialized registers to:
adjust a size and location of the generalized queues to dynamically adapt the generalized queue to the current operating environment;
inform the tightly coupled processors when the generalized queues are empty, full, not empty, or not full; and
enable attention conditions to be passed between the tightly coupled processors.

15. A method for coordinating communications between a plurality of tightly coupled processors, comprising:
configuring one or more generalized queues to hold a particular type of content;
configuring one or more specialized registers to assist the tightly coupled processors in adapting and utilizing the one or more generalized queues for storing and passing entries between the tightly coupled processors and facilitating interprocessor communications;
storing and retrieving information in the configured specialized registers for use in adapting the generalized queues to match a current operating environment;
storing and retrieving information in the configured specialized registers for use in determining when entries may be supplied into or received from the generalized queues; and
storing and retrieving attention conditions in the configured specialized registers to be passed between the tightly coupled processors.

16. The method as recited in claim 15, wherein for each generalized queue, the method further comprises storing, in the configured specialized registers, a put pointer for indicating a next location in the queue into which an entry is to be supplied and a get pointer for indicating a next location in the queue from which a entry is be received, the get and put pointers for assisting in supplying entries into the generalized queue, receiving entries from the generalized queue, and determining whether the generalized queue is empty, full, not full, or not empty.

17. The method as recited in claim 15, wherein for each generalized queue, the method further comprises storing, in the configured specialized registers, an end location of the generalized queue for dynamically adapting a size of the generalized queue to the current operating environment.

18. The method as recited in claim 17, wherein for each generalized queue, the method further comprises storing, in the configured specialized registers, requests from two or more processors to reset the generalized queue in order to facilitate a coordinated reset of that generalized queue.

19. The method as recited in claim 18, further comprising changing the size of a generalized queue by performing a coordinated reset of the generalized queue and storing a new end location in the configured specialized registers.

20. The method as recited in claim 15, further comprising storing, in the configured specialized registers, attention conditions from one processor destined for another processor.

21. The method as recited in claim 15, further comprising storing, in the configured specialized registers, whether the generalized queues are not empty or not full.

22. The method as recited in claim 15, further comprising storing, in the configured specialized registers, an enable indicating whether an attention condition destined for one processor will be visible to that processor.

23. The method as recited in claim 15, further comprising storing, in the configured specialized register, an enable indicating whether an indicator of whether the generalized queue is not empty or not full destined for one processor will be visible to that processor.

24. In a multi-processor system including a plurality of tightly coupled processors and one or more generalized queues communicatively couplable to the tightly coupled processors for storing entries to be passed between the tightly coupled processors, a method for coordinating communications between the tightly coupled processors, comprising:

configuring one or more specialized registers to assist the tightly coupled processors in adapting and utilizing the generalized queues for storing and passing entries between the tightly coupled processors and facilitating interprocessor communications;

adjusting a size and location of the generalized queues in accordance with information stored in the specialized registers to dynamically adapt the generalized queues to the current operating environment;

informing the tightly coupled processors when the generalized queues are empty, full, not empty, or not full in accordance with information stored in the specialized registers; and passing attention conditions between the tightly coupled processors in accordance with information stored in the specialized registers.

* * * * *